US012373740B1

(12) United States Patent
Honary

(10) Patent No.: US 12,373,740 B1
(45) Date of Patent: Jul. 29, 2025

(54) DISTRIBUTED IMPLEMENTATION OF RANDOM FOREST IN A NETWORK

(71) Applicant: Ryan Honary, Newport Coast, CA (US)

(72) Inventor: Ryan Honary, Newport Coast, CA (US)

( * ) Notice: Subject to any disclaimer, the term of this patent is extended or adjusted under 35 U.S.C. 154(b) by 0 days.

(21) Appl. No.: 18/800,301

(22) Filed: Aug. 12, 2024

(51) Int. Cl.
*G06N 20/20* (2019.01)

(52) U.S. Cl.
CPC .................... *G06N 20/20* (2019.01)

(58) Field of Classification Search
CPC ............... G06N 20/20; G06N 20/00
See application file for complete search history.

(56) References Cited

U.S. PATENT DOCUMENTS

2019/0325060 A1* 10/2019 Fenoglio ............... G06F 16/906
2022/0355147 A1* 11/2022 Lee ....................... A62C 3/0271

OTHER PUBLICATIONS

Hu et al, "Distributed Fire Detection and Localization Model Using Federated Learning", 2023, Mathematics 2023 11, 7, pp. 1-19. (Year: 2023).*
Jamil et al, "Maximise unsafe path routing protocol for forest fire monitoring system using Wireless Sensor Networks", 2012 IEEE 3rd International Conference on Networked Embedded Systems for Every Application (NESEA), Liverpool, UK, 2012, pp. 1-8. (Year: 2012).*
Hu et al, "Distributed Fire Detection and Localization Model Using Federated Learning", 2023, Mathematics 2023 11, 7, pp. 1-19. (Year: 2019).*

* cited by examiner

*Primary Examiner* — Alexey Shmatov
*Assistant Examiner* — Clint Mullinax
(74) *Attorney, Agent, or Firm* — Plager Schack LLP; Mark H. Plager; Alexis Saenz

(57) ABSTRACT

A network includes a server and a plurality of geographically dispersed computing nodes connected to the server. A detector is coupled to one or more of the computing nodes. A plurality of processors are included. A first processor is in a first computing node. A second processor is in a second computing node. The server is configured to generate a predictive model of an event detected by the detector. The server is configured to distribute predictive modelling computations of the predictive model, in parts across the geographically dispersed computing nodes. The first processor in the first computing node performs at least a first part of the predictive modelling computations. The second processor in the second computing node performs at least a second part of the predictive modelling computations.

5 Claims, 3 Drawing Sheets

DISTRIBUTED IMPLEMENTATION OF RANDOM FOREST IN A NETWORK

RELATED APPLICATIONS

None.

BACKGROUND

The embodiments herein relate generally to network systems, and more particularly to a distributed implementation of random forest in a network.

The implementation of machine learning algorithms on the edge of a network is typically performed by a single processor. A challenge arises if the system is operating in a fragile and chaotic environment. For example, if that processor becomes unavailable for whatever reason, the entire process and ability to provide predictions by the machine learning algorithm will be disrupted.

Similarly, the implementation of regression models in machine learning is commonly performed by a single processor. Random forest models for example, can be limited when performed by a single processor. Random forest models can be invariant under scaling and various other transformations of feature values, which can lead to inaccurate classification as scaling occurs.

SUMMARY

In one embodiment, a network is disclosed that includes a server and a plurality of geographically dispersed computing nodes connected to the server. A detector is coupled to one or more of the computing nodes. A plurality of processors are included. A first processor is in a first computing node. A second processor is in a second computing node. The server is configured to generate a predictive model of an event detected by the detector. The server is configured to distribute predictive modelling computations of the predictive model, in parts across the geographically dispersed computing nodes. The first processor in the first computing node performs at least a first part of the predictive modelling computations. The second processor in the second computing node performs at least a second part of the predictive modelling computations.

In another embodiment, a method for computer-aided modelling of an event is disclosed. The method includes receiving, by a server, a signal indicating detection of the event. The signal is forwarded to a plurality of geographically dispersed computing nodes connected in a network to the server. The server distributes predictive modelling computations of a predictive model, performed in parts across the geographically dispersed computing nodes. A first processor in a first of the computing nodes performs at least a first part of the predictive modelling computations. A second processor in a second of the computing nodes performs at least a second part of the predictive modelling computations. The server generates a predictive model of the event detected by the detector, based on the distributed predictive modelling computations performed in parts across the geographically dispersed computing nodes.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Overview

Figure 1:
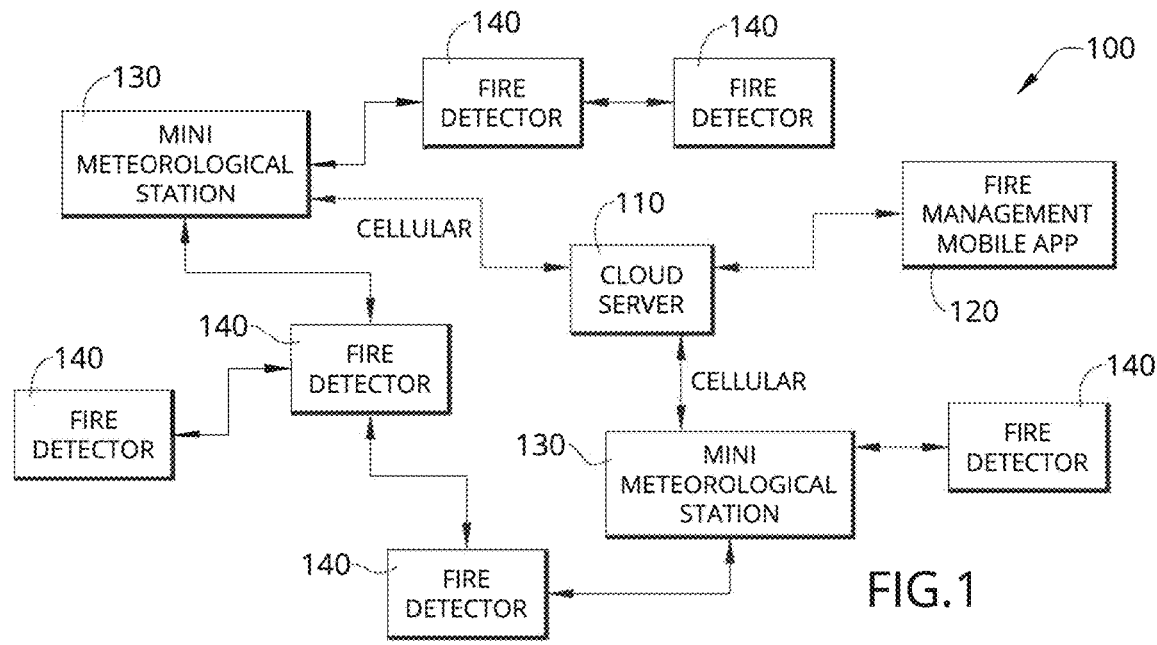
FIG. 1 is a block diagram of a mesh network according to an embodiment.

The present disclosure generally relates to systems and methods for distributed implementation of random forest modelling in a network. The network may include a plurality of processors. The random forest modelling is performed in a distributed implementation across the plurality of processors. The forest may be distributed across the plurality of processors based on independent variables, so all the processing for each independent variable may be performed by an individual. For example, the random forest may be distributed into a series of sub-forests being implemented on different processors allowing robust operation whenever one processor becomes unavailable. As will be appreciated, if a single processor becomes unavailable, only the processing of a single variable may be temporarily lost. The random forest prediction capabilities are unharmed for all other independent variables. This allows for a very graceful degradation of quality in the event an increasing number of processors are lost.

In one example application, the subject technology may enable the creation of a system that can be used to predict the growth of natural hazards. The robustness of the process and system allows the subject technology to operate effectively in chaotic and fragile environments such as in the presence of natural hazards and disasters, where a processor in the network may become unavailable due to physical damage caused by the hazard. In these situations, if some of the processors are destroyed due to the natural disaster, the random forest architecture can still predict the growth pattern of the natural disaster as the disaster progresses.

Some of the embodiments disclosed herein may sometimes take the form of software processes. As will be appreciated, aspects of the subject technology provide more than mere abstract concepts and processes. It is well-recognized that applications using machine learning and/or artificial intelligence are considered technology and embody more than mere abstract concepts. Moreover, the application of the software processes disclosed herein make use of devices such as detectors and apply the feedback from detectors into practical applications that predict the potential change in events such as environmental phenomena. Environmental phenomena may include for example, natural disasters such as fires, hurricanes, landslides, etc. where the phenomena may expand from one location to another. It will be further appreciated that the predictive modelling provided by embodiments of the subject technology provide data that can be used to plan and mitigate the effects of environmental phenomena. Moreover, the distributed nature of processing the predictive model at different nodes, (which may be on a networks' edge) protects the integrity of the system providing a safeguard against processors being lost due to for example, destruction by the environmental phenomena.

Definitions

Engine, as used, herein refers to software and/or hardware module that executes the foundation or crucial task for other programs.

Model or Modelling, as used herein, refers to a computing process used to predict outcomes by analyzing patterns in a given set of input data.

Network Edge, as used herein, refers to a connection or interface between a device or local network and the overall network or Internet.

Node, as used herein, refers to a computing device as an endpoint for data transmissions or redistribution in a network.

Mesh Network, as used herein, refers to a plurality of computing devices connected in communication to each other, where the failure of one computing device results in the re-routing of messages through other computing devices in the network.

EMBODIMENTS

Referring now to FIG. 1, a network 100 (which in some embodiments may be a system) is shown according to an embodiment. The network 100 includes a managing server 110 (sometimes referred to simply as the "server 110"). In some embodiments, the server 110 may be a cloud-based server. Some embodiments may include a management app 120 configured for a particular application. As shown, the management app 120 is labeled to describe use in managing fire outbreaks. For sake of illustration, the embodiments that follow may be described in the context of predicting the outbreak and/or spread of a fire with elements that are germane to fire events. However, it should be understood that other applications are contemplated within the scope of this disclosure that include other types of environmental phenomena.

In one embodiment, one or more meteorological stations 130 may be network connected to the server 110. The meteorological stations 130 may be physical locations that include a detector 140 and/or computing device node on the edge of the network 100 connected to the server 110. For the contextual application being discussed, the detectors 140 may be configured to detect fire, smoke, and/or excess heat. While the illustration is for fire associated applications, it should be understood that the meteorological stations 130 may include other types of detectors 140 that sense different environmental attributes that may be monitored by the network 100 for other types of conditions/disaster situations.

The management app 120 may receive alerts in the network 100 when a fire is detected by one of the detectors 140 and may display the alert to users that have the app 120 downloaded onto a computing device. The management app 120 may show which detectors 140 in the network 100 have provided alerts thus communicating the location of where the fire was detected. In some embodiments, the management app 120 includes a user interface that displays detailed outputs of the detectors 140 (for example, temperature, humidity, smoke, etc. in the location of detection and in locations of the meteorological stations 130, generally). In the event the server 110 (or the machine learning prediction engine 540 of FIG. 5 discussed in detail below) predicts a fire growth path, a predicted fire map will be shown on the user interface of the management app 120.

Figure 2:
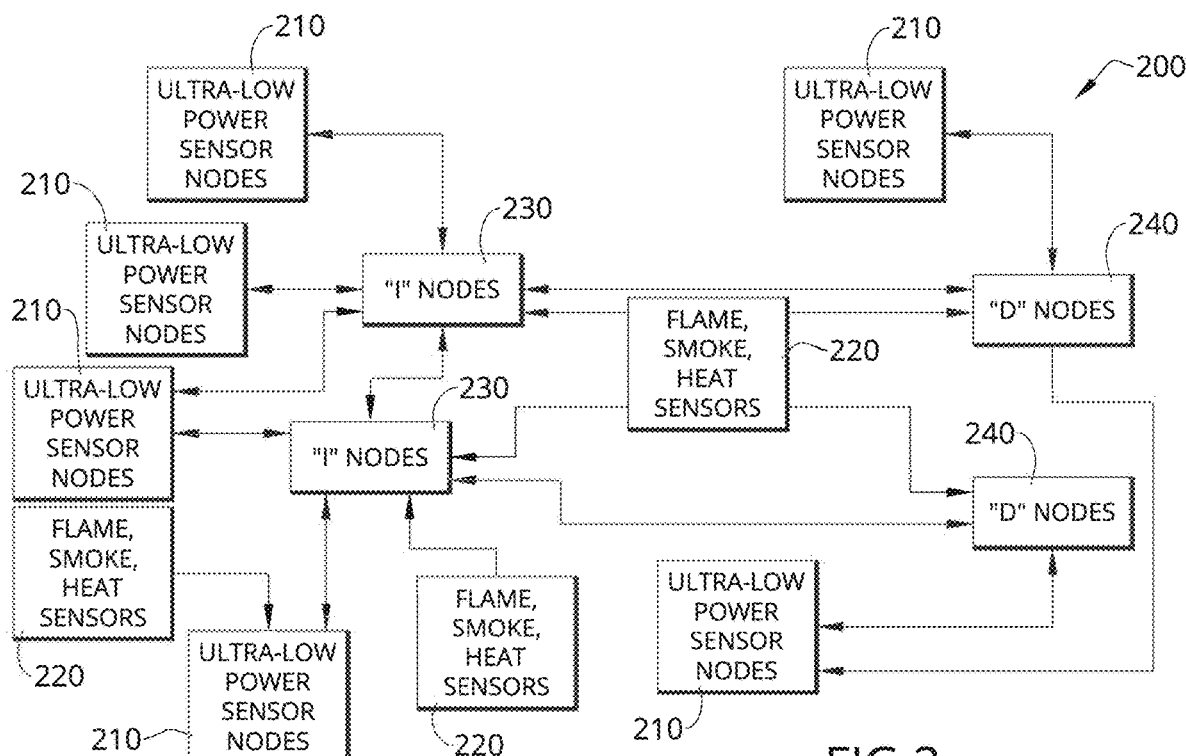
FIG. 2 is a block diagram of a wireless sensor network according to an embodiment according to an embodiment.

FIG. 2 shows a network 200 according to an embodiment. The network 200 shows the connection between various nodes. In some embodiments, the network 200 may be a mesh network. As a mesh network, if one of the nodes fails or otherwise becomes unavailable, communication to other nodes in the network 200 may be re-routed to maintain the integrity of the network 200 functional. Embodiments may include ultra-low power sensor nodes 210 connected to "I" nodes 230 and/or "D" nodes 240. Sensors 220 may be connected to any or all of the ultra-low power sensor nodes 210, "I" nodes 230 and, "D" nodes 240. The "D" nodes 240 are computing nodes that have a cellular connection back to the Internet cloud. The "I" nodes 230 (intermediate nodes) are computing nodes that create the mesh network. The "I" nodes 230 connect to each other and to the ultra-low power sensor nodes. The "I" nodes 230 may run the distributed prediction model (for example, an A.I. random forest). In some embodiments, the "I" nodes 230 might have actual sensors (for example, detectors 140) attached directly to them, or not, depending on the deployment configuration. The "I" nodes 230 may have a battery that is chargeable via solar panels. The ultra-low power sensor nodes 210 are very small and very low power (for example, may run on 2 AA batteries for years). The (ultra-low power nodes?) may have most of the environmental sensors attached directly to them. They are connected to the mesh by connecting to one or more "I" nodes 230.

Figure 3:
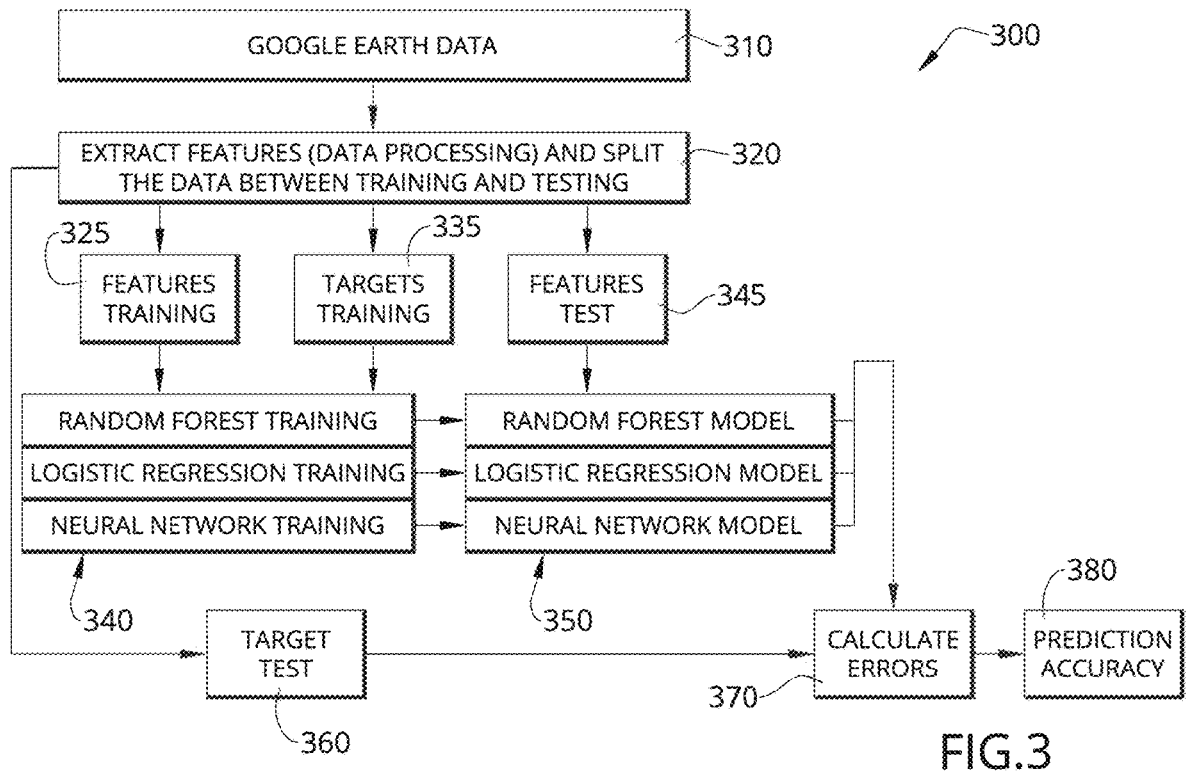
FIG. 3 is a flowchart of a machine learning process according to an embodiment according to an embodiment.

FIG. 3 shows a process 300 for generating a prediction model according to an embodiment. The prediction model from process 300 may be used as an initial data set for prediction models generated in real-time by the network embodiments disclosed herein. A seed set of data may be gathered 310 from a published source. Features may be extracted 320 and split into sets. One set may be a features training data 325. Another set may be targets training data 335. A third set may be set aside for features testing data 345. A target test value 360 may be generated after feature extraction. The features training set 325 and targets training set 335 may be provided to one or more training models 340 to generate prediction model(s) 350. The features testing data 345 may be added to the output from the training models 340. The output from the prediction model(s) 350 may be compared to the target test value 360 to calculate errors 370 in the prediction model(s) 350. A prediction accuracy 380 may be generated based on the error calculation.

Figure 4:
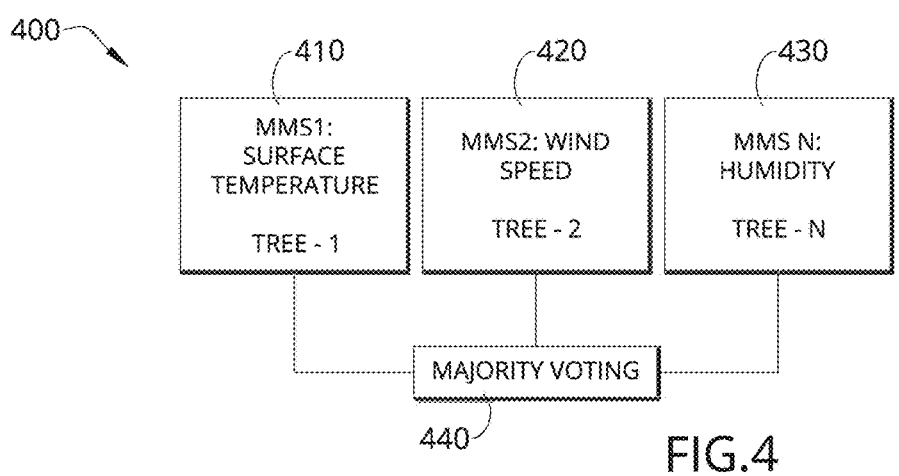
FIG. 4 is a flowchart of a parallel random forest process according to an embodiment.

FIG. 4 shows an example prediction model process 400 implemented on an edge of a network by a plurality of computing nodes 410, 420, and 430. In one embodiment, the computing nodes 410, 420, and 430 may be individual mini meteorological stations (MMS) or the MMS may respectively house a respective computing node 410, 420, or 430. The prediction model process 400 shows a random forest implementation for predicting fire spread in an area for illustrative purposes. However, it should be understood that other model methods may be used as was shown in FIG. 3. Nodes in the network may process an independent variable of the prediction model that other nodes do not process. The independent variables may be processed in parallel across different nodes in the network. In the random forest method disclosed, the computing nodes may each process a sub-forest computation of the overall random forest-based prediction model being generated by the managing server 110 (FIG. 1). The sub-forest trees computed may be based on independent variables related to the environmental phenomena. In the illustrative application being discussed, the variables are related to a fire. A first computing node 410 may process a first independent variable (for example, surface temperate). A second computing node 420 may process a second independent variable that is distinct from the first independent variable (for example, wind speed). Another computing node 430n (representing that there may be an infinite number of nodes in between node 420 and node 430n), may process another independent variable that may be distinct from either the first and/or second independent variable (for example, humidity). The output from the computing nodes 410, 420 . . . 430n may be processed by the server 110 to score majority voting values 440 used in the overall prediction model. In one example, the overall prediction may try to answer whether an impending area is likely to catch fire or not based on the data processed by respective processors in the network.

Figure 5:
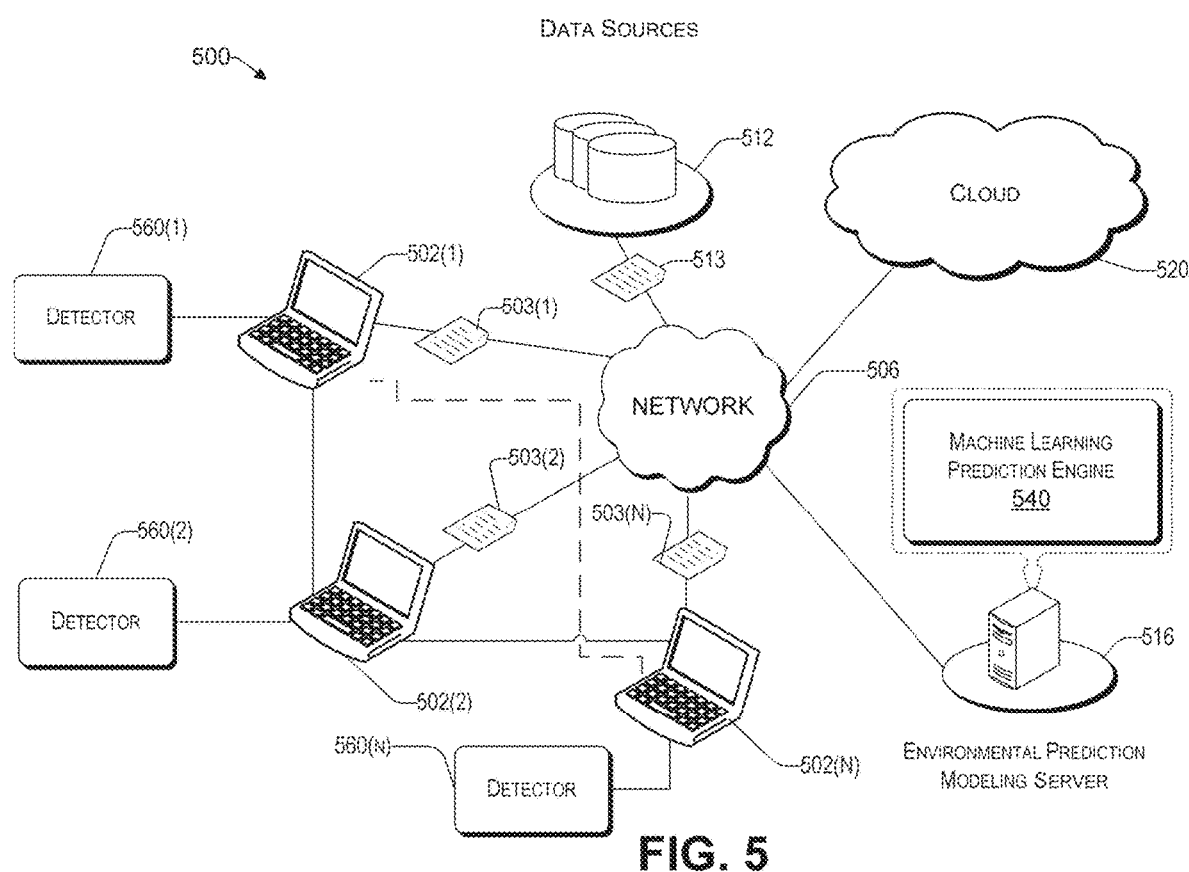
FIG. 5 is a block diagram of a system for a distributed implementation of random forest in a network according to an embodiment.

Referring temporarily to FIG. 5, a system 500 (referred to generally below as the "system 500" or just the "system") for distributed implementation of prediction modeling is shown according to an embodiment. The system 500 generally includes a plurality of computing device nodes 502(1), 502(2) . . . 502(N) connected in a mesh configuration through a network 506 to a database 512. In some embodiments, the plurality of computing device nodes 502(1), 502(2) . . . 502(N) may be located on the edge of a network. Other elements connected to the network 506 and to the plurality of computing device nodes 502(1), 502(2) . . . 502(N), include an environmental prediction modeling server 516, and the cloud 520. The environmental prediction modeling server 516 may a machine learning prediction engine 540 providing prediction modeling using the techniques described above. One or more of the computing device nodes 502(1) to 502(N) may include or be connected to a detector 560(1), 560(2), to 560(N). The detectors 560(1) to 560(N) may be configured to detect environmental attributes that may be used as variables in computing prediction models. The computing device nodes 502(1) to 502(N) and detectors 560(1) to 560(N) may be individually located in geographic areas monitoring the environment for phenomena that may indicate an impending or occurring disaster. Each of the computing device nodes 502(1) to 502(N) may include a computer processor configured to perform the methods disclosed above. As discussed above, in an exemplary embodiment, should one of the computer processors in the system 500 become unavailable (for example, due to failure or destruction being within an area of a disaster), the remaining computer processors associated with respective computing device nodes 502(1) to 502(N) continue to process data for prediction modeling. In some embodiments, the respective computing device nodes 502(1) to 502(N) process independent variables of the environmental event in sub-modeling processes that are used by the machine learning prediction engine 540 to generate the overall prediction model.

The network 506 allows the machine learning prediction engine 540, which is a software program running on environmental prediction modeling server 516, to communicate with the data source 512, computing device nodes 502(1), 502(2) . . . 502(N), and/or the cloud 520, to provide data processing of detected environmental phenomena. The data source 512 may include source data used to generate initial prediction models and historical data gathered from the detectors 560(1) to 560(N). In some embodiments, data obtained by the detectors 560(1) to 560(N) may be processed by individual respective the computing device nodes 502(1) to . . . 502(N) as sub-prediction model processes (for example, sub-forests of a random forest process) 503(1), 503(2), to 503(N) to be processed by the machine learning prediction engine 540. Sub-prediction models and detected environmental data may be stored as data packets 513 in the data source 512. In one embodiment, the data processing is performed at least in part within a cloud network 520 where the computing device nodes 502(1), 502(2) . . . 502(N) may be located.

The components of the computing device nodes 502(1) to 502(N) and server 516 (or server 110 of FIG. 1) may include, but are not limited to, one or more computer processors, a system memory, data storage, and a computer program product having a set of program modules including files and executable instructions performing any one or more of the methods included in this disclosure. The computing devices may typically include a variety of computer system readable media. Such media could be chosen from any available media that is accessible including non-transitory, volatile and non-volatile media, removable and non-removable media for use by or in connection with an instruction execution system, apparatus, or device. The system memory may include one or more computer system readable media in the form of volatile memory, such as a random-access memory (RAM) and/or a cache memory.

As will be appreciated by one skilled in the art, aspects of the disclosed technology may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." In addition, some embodiments below are described with reference to block diagrams of methods, apparatus (systems) and computer program products. It will be understood that each block of the block diagrams, and combinations of blocks in the flowchart illustrations and/or block diagrams, can be implemented by computer program instructions. These computer program instructions may be provided to the processor/controller 105, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A network, comprising:
   a server;
   a plurality of geographically dispersed computing nodes connected to the server;
   a first detector coupled to a first computing node;
   a second detector coupled to a second computing node, wherein the first detector and the second detector are configured to detect one or more independent variables related to a fire; and
   a plurality of processors, wherein:
      a first processor is in the first computing node,
      a second processor is in the second computing node,
      the server is configured to generate a predictive model of an event detected by the detector using a random forest method,
      the server is configured to distribute a plurality of sub-forest predictive modelling computations of the predictive model, in parts across the geographically dispersed computing nodes,
      the first processor in the first computing node performs a first sub-forest computation of the random forest method based on a first independent variable detected by the first detector,
      the second processor in the second computing node performs a second sub-forest computation of the random forest method based on a second independent variable that is distinct from the first independent variable, detected by the second detector,
      the second sub-forest computation includes different sub-forest decision trees than that of the first sub-forest computation of the random forest method,
      upon a determination that the first processor fails or is destroyed by fire, re-routing processing of the first sub-forest computation of the random forest method to the second processor in the second computing node, and
   the server is configured to determine whether an impending area is likely to catch fire or not based on the sub-forest computations of the predictive modelling computations performed by any remaining processors in the plurality of processors that have not failed or are destroyed.

2. The network of claim 1, wherein the plurality of geographically dispersed computing nodes are connected to the server in a mesh network.

3. The network of claim 1, wherein the detector is configured to detect fire and the predictive model generated by the server predicts a spread of the fire.

4. A method for computer-aided modelling of an event, comprising:
   receiving, by a server, a signal indicating detection of a fire;
   forwarding the signal to a plurality of geographically dispersed computing nodes and a plurality of processors connected in a network to the server;
   distributing, by the server, predictive modelling computations of a predictive model using a random forest method, performed in parts across the geographically dispersed computing nodes;
   performing, by a first processor in a first of the computing nodes, a first sub-forest computation of the random forest method based on a first independent variable detected by a first detector of the first computing node;
   performing, by a second processor in a second of the computing nodes, a second sub-forest computation of the random forest method based on a second independent variable detected by a second detector of the second computing node, wherein the second sub-forest computation includes different sub-forest decision trees than that of the first sub-forest computation of the random forest method;
   upon a determination that the first processor fails or is destroyed by fire, re-routing processing of the first sub-forest computation of the random forest method to another computing node and another processor in the network; and
   generating, by the server, a predictive model of the fire detected by the detector, wherein the server is configured to determine whether an impending area is likely to catch fire or not based on the sub-forest computations of the predictive modellinq computations performed by any remaining processors in the plurality of processors that have not failed or are destroyed.

5. The method of claim 4, wherein the predictive model generated by the server predicts a spread of the fire.

* * * * *